United States Patent [19]
Hori

[11] Patent Number: 5,943,509
[45] Date of Patent: Aug. 24, 1999

[54] SMALL SIZE INTER-PROCESSOR DATA TRANSFER SYSTEM

[75] Inventor: Yoshihiro Hori, Tokyo, Japan

[73] Assignee: NEC Corporation, Tokyo, Japan

[21] Appl. No.: 09/105,195

[22] Filed: Jun. 26, 1998

[30] Foreign Application Priority Data

Jun. 27, 1997 [JP] Japan .................................. 9-172069

[51] Int. Cl.⁶ .................................................. G06F 13/14
[52] U.S. Cl. ........................................................ 395/874
[58] Field of Search ...................... 364/DIG. 1 MS File, 364/DIG. 2 MS File; 711/100, 109; 395/200.3, 200.43, 200.44, 200.62, 200.47, 308, 821, 852, 854, 872, 873, 874, 877

[56] References Cited

U.S. PATENT DOCUMENTS

| | | | |
|---|---|---|---|
| 4,894,797 | 1/1990 | Walp | 711/109 |
| 4,935,894 | 6/1990 | Ternes et al. | 395/308 |
| 5,768,626 | 6/1998 | Munson et al. | 395/877 |

*Primary Examiner*—Robert B. Harrell
*Attorney, Agent, or Firm*—Young & Thompson

[57] ABSTRACT

In an inter-processor data transfer system between first and second processors, a first FIFO is provided for data transmitted from the first processor to be written therein, and a first register is provided for indicating whether the first FIFO is write-enabled or write-disabled. A first request circuit transmits a write-request from the first processor to the second processor by way of the first FIFO. A first notification circuit notifies the first processor if data received by the second processor by way of the first FIFO is normal or abnormal. Also, a second FIFO is provided for data transmitted from the second processor to be written therein, and a second register is provided for indicating whether the second FIFO is write-enabled or write-disabled. A second request circuit transmits a write-request from the second processor to the first processor by way of the second FIFO. A second notification circuit notifies the second processor if data received by the first processor by way of the second FIFO is normal or abnormal.

7 Claims, 9 Drawing Sheets

SMALL SIZE INTER-PROCESSOR DATA TRANSFER SYSTEM

BACKGROUND OF THE INVENTION

1. Field of the Invention

The present invention relates to a data transfer system for transferring data between two processors, i.e., two central processing units (CPUs).

2. Description of the Related Art

A prior art inter-processor data transfer system of the type under consideration includes two pairs of first-in first-out memories (FIFOs) are arranged between a pair of CPUs and data are written and read in the FIFOs at the operating speeds of the respective processors (see JP-A-56-135261). This will be explained later in detail.

In the above-described prior art data transfer system, however, a very large circuit is required for the system as a whole.

Also, it takes time for each of the CPUs to find out if the partner CPU received the data it sent out. Further, if one of the CPUs wants specific data of the other CPU and requested the latter CPU to send the specific data by way of a related FIFO, the data that the former CPU receives by way of a related FIFO may not be the data it wants.

SUMMARY OF THE INVENTION

It is an object of the present invention to provide an inter-processor data transfer system having a relatively small circuit configuration for transferring data between a pair of CPUs, wherein each of the CPUs can find out within a short time if the partner processor received the data it sent out.

Another object is to provide an inter-processor data transfer system capable of requesting specific data to be reliably transferred to it from the other CPU.

According to the present invention, in an inter-processor data transfer system between first and second CPUs, a first FIFO is provided for data transmitted from the first CPU to be written therein, and a first register is provided for indicating whether the first FIFO is write-enabled or write-disabled. A first request circuit transmits a write-request from the first CPU to the second CPU by way of the first FIFO. A first notification circuit notifies the first CPU if data received by the second CPU by way of the first FIFO is normal or abnormal. Also, a second FIFO is provided for data transmitted from the second CPU to be written therein, and a second register is provided for indicating whether the second FIFO is write-enabled or write-disabled. A second request circuit transmits a write-request from the second CPU to the first CPU by way of the second FIFO. A second notification circuit notifies the second CPU if data received by the first CPU by way of the second FIFO is normal or abnormal.

BRIEF DESCRIPTION OF THE DRAWINGS

The present invention sill be more clearly understood from the description as set forth below, as compared with the prior art, with reference to the accompanying drawings, wherein.

DESCRIPTION OF THE PREFERRED EMBODIMENTS

Before the description of the preferred embodiments, a prior art inter-processor data transfer system will be explained with reference to FIG. 1 (see JP-A-56-135261)

Figure 1:
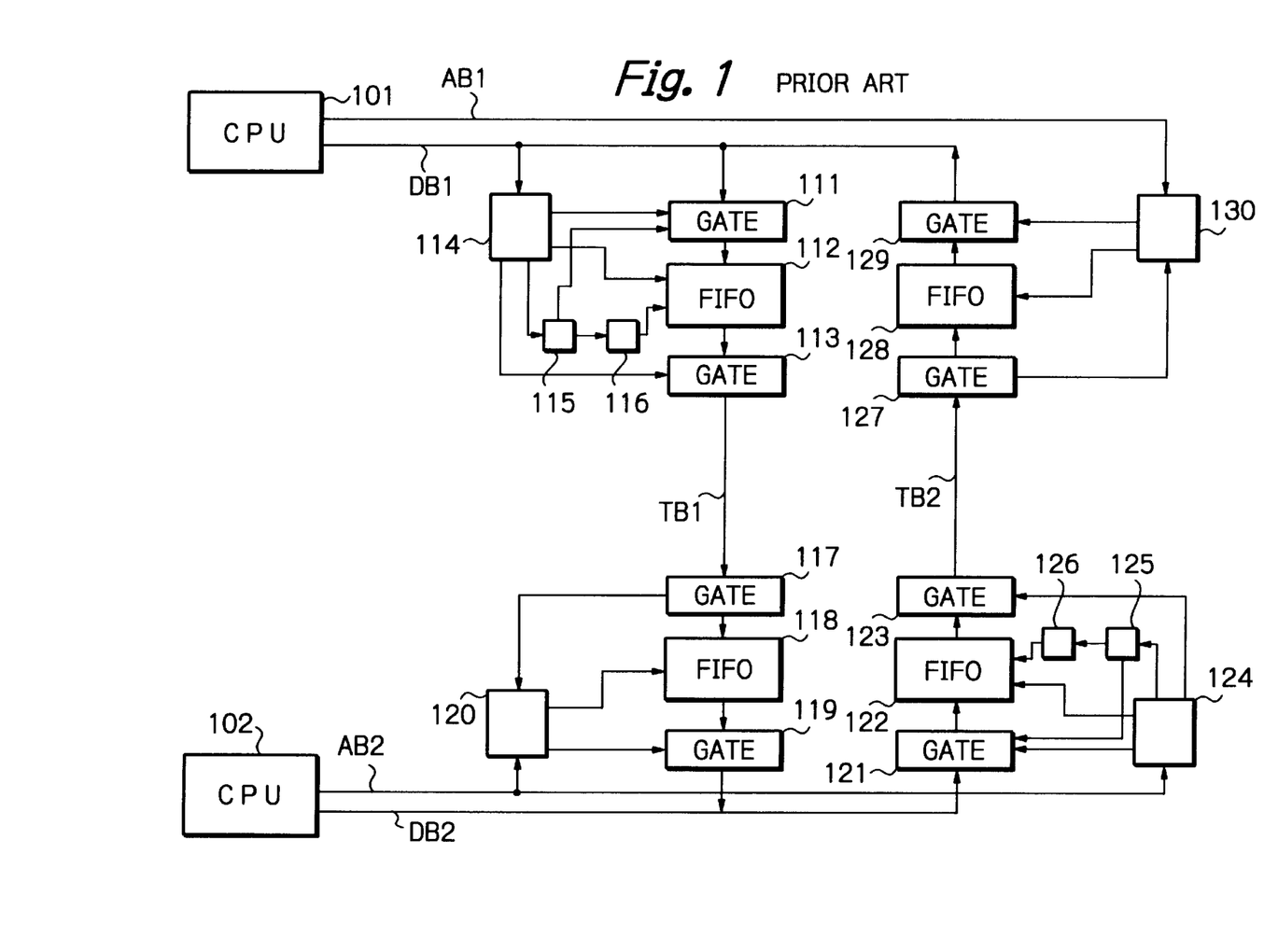
FIG. 1 is a block circuit diagram illustrating a prior art inter-processor data transfer system.

In FIG. 1, a CPU 101 having an address bus AB1 and a data bus DB1 and a CPU 102 having an address bus AB2 and a data bus DB2 are provided. In order to carry out data transfer between the CPUs 101 and 102, inter-process data transfer buses TB1 and TB2 are provided.

Provided between the data bus DB1 and the inter-processor data transfer bus TB1 are a gate circuit 111, a FIFO 112 and a gate circuit 113, the gate circuit 111 is controlled by a data transmission identification circuit 114 and a transfer data number identification circuit 115, The FIFO 112 is controlled by the data transmission identification circuit 114 and a transmission data write circuit 116. The gate circuit 113 is controlled by the data transmission identification circuit 114.

Also, provided between the inter-processor data transfer bus TB1 and the data bus DB2 are a gate circuit 117, a FIFO 118 and a gate circuit 119. The FIFO 118 is controlled by a data reception identification circuit 120. The gate circuit 119 is also controlled by the data reception identification circuit 120.

Provided between the data bus DB2 and the inter-processor data transfer bus TB2 are a gate circuit 121, a FIFO 122 and a gate circuit 123. The gate circuit 121 is controlled by a data transmission identification circuit 124 and a transfer data number identification circuit 125. The FIFO 122 is controlled by the data transmission identification circuit 124 and a transmission data write circuit 126. The gate circuit 123 is controlled by the data transmission identification circuit 124.

Also, provided between the inter-processor data transfer bus TB2 and the data bus DB1 are a gate circuit 127, a FIFO 128 and a gate circuit 129. The FIFO 128 is controlled by a data reception identification circuit 120. The gate circuit 129 is also controlled by the data reception identification circuit 130.

When data is transferred from the CPU 101 to the CPU 102, the CPU 101 sends out a data transfer command via the address bus AB1 to the data transmission identification circuit 114. When the data transmission identification circuit 114 detects the start of the data by the data transfer command, the data transmission identification circuit 114 opens the gate circuit 111 so that the data that has been sent from the CPU 101 by way of the data bus DB1 is transferred to the FIFO 112. Thus, the data is stored in the FIFO 112.

Upon completing the operation of storing the data in the FIFO 112, the data transmission identification circuit 114 opens the gate circuit 113, so that the data is transferred to the CPU 102 by way of inter-processor data transfer bus TB1.

Upon detecting that data to be transferred is sent by way of the inter-processor data transfer bus TB1, the gate circuit 117 is opened so that the data that has been stored in the FIFO 112 is stored in the FIFO 118 by way of the gate circuit 113, the inter-processor data transfer bus TB1 and the gate circuit 117. Then, the gate circuit 117 notifies the data reception identification circuit 120 of the reception of the data to be transferred. On the other hands the CPU 102 periodically performs a scanning operation upon the data reception identification 120 by way of the address bus AB2 to find out if data to be transferred is received. Upon detecting the reception of data to be transferred, the CPU 102 operates the data reception identification circuit 120 to open the gate circuit 119 to store the data to be transferred that has been stored in the FIFO 118 by way of the gate circuit 119 and the data bus DB2. Thus, the operation of transferring data from the CPU 101 to the CPU 102 is completed.

When data is transferred from the CPU 102 to the CPU 101, the above-described sequence is reversed.

With the above-described inter-processor data transfer system, however a very large circuit is required for the system as a whole, because inter-processor data transfer buses and a total of four FIFOs, i.e., two for transmission and two for reception, are required for each processor interface.

Additionally, since data are transferred between the CPUs 101 and 102 only by way of FIFOs, there is no way to find out if the data from one of the CPUs is received by the other CPU until the other CPU sends back the data by way of the FIFOs. Therefore, it takes time for each of the CPUs to find out if the data sent out from it is successfully received by the other CPU.

When the prior art inter-processor data transfer system of FIG. 1 is applied to an automatic switching system for mutually transferring data to and from a line/trunk circuit, a CPU has to wait until it confirms that the data it has sent out has been normally transmitted to and received by the line/trunk circuit by receiving a message from the line/trunk circuit for a normal reception of the data before it can proceed to the next processing operation. Thus, the automatic switching system will inevitably show a poor processing ability.

Furthermore, since the CPUs 101 and 102 write data in their respective FIFOs asynchronously, at the time when the processor CPU 101 is requesting a specific data, the CPU 102 can be writing a different data in the FIFO 128.

Thus, even if the CPU 101 wanted a specific data of the CPU 102 and requested the CPU 102 to send this data by way of the FIFO 112, the data that the CPU 101 receives by way of the FIFO 128 might not be the data it wants.

Figure 2:
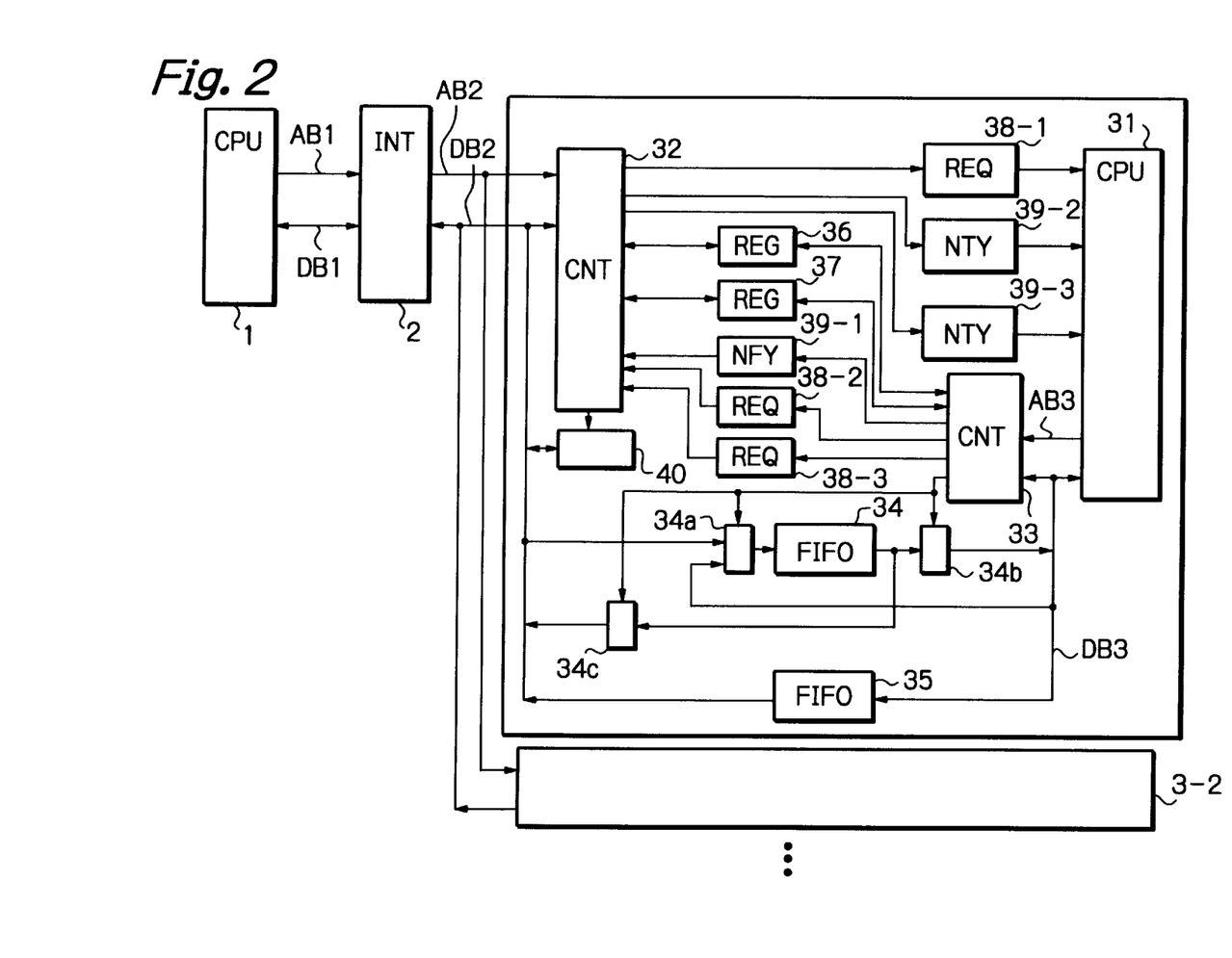
FIG. 2 is a block circuit diagram illustrating a first embodiment of the inter-processor data transfer system according to the present invention.

In FIG. 2, which illustrates a first embodiment of the inter-processor data transfer system according to the present invention, this system is applied to an automatic switching system illustrated. The automatic switching system is constructed by a CPU 1, air interface circuit 2, and a plurality of line/truck circuits 3-1, 3-2, .... The CPU 1 has an address bus AB1 and a data bus DB1 connected to the interface circuit 2. Also, the interface circuit 2 has an address bus AB2 and a data bus DB2 connected to the line/trunk circuits 3-1, 3-2, Further, the line/trunk circuit such as 3-1 has an internal address bus AB3 and an internal data bus DB3.

The line 1 trunk circuit 3-1 is constructed by a CPU 31 having the address bus AB3 and the data bus DB3, a control circuit 32 connected to the address bus AB3 and the data bus DB3, and a control circuit 32 connected to the address bus AB2 and the data bus DB2.

Also, the line/trunk circuit 3-1 is contructed by a FIFO 34 for transferring data from the CPU 1 to the CPU 31 and a FIFO 35 for transferring data from the CPU 31 to the CPU 1. A register 36 is used for indicating whether or not the FIFO 34 is being used, and a register 37 is used for indicating whether or not the FIFO 35 is being used.

Request circuits 38-1, 38-2 and 38-3 and notification circuits 39-1, 39-2 and 39-3 are provided.

The request circuit 38-1 is formed by an interrupt circuit for generating a request from the CPU 1 to the CPU 31 for reading the FIFO 34. The notification circuit 39-1 notifies the CPU 1 if data read from the FIFO 34 is normal or abnormal.

The request circuit 38-2 is formed by a register for generating a request from the CPU 31 to the CPU 1 for reading the FIFO 35. The notification circuit 39-2 notifies the CPU 31 if data read from the FIFO 35 is normal or abnormal.

The request circuit 38-3 is formed by a register for generating a request from the CPU 31 to the CPU 1 for reading the FIFO 34. The notification circuit 39-3 notifies the CPU 1 if data read from the FIFO 34 is normal or abnormal.

The FIFO 34 is associated with a selector 34$a$, and output circuits 34$b$ and 34$c$. In a first state, the selector 34$a$ connects the data bus DB2 to the FIFO 34, and the output circuits 34$b$ and 34$c$ are activated and deactivated, respectively. As a result, data is transferred from the CPU 1 via the FIFO 34 to the CPU 31. On the other hand, in a second state, the selector 34$a$ connects the data bus DB3 to the FIFO 34, and the output circuits 34$b$ and 34$c$ are deactivated and activated, respectively. As a result, data is transferred from the CPU 31 via the FIFO 34 to the CPU 1.

The selector 34$a$ and the output circuits 34$b$ and 34$c$ are controlled by the CPU 31 through the control circuit 33. Note that each of the output circuits 34$b$ and 34$c$ is in a through state when it is activated, while each of the output circuits 34$b$ and 34$c$ is in a high impedance state when it is deactivated.

A parity check circuit 40 is connected to the data bus DB2, to check if the data on the data bus DB2 is normal or abnormal by means of a parity check.

Figure 3A:
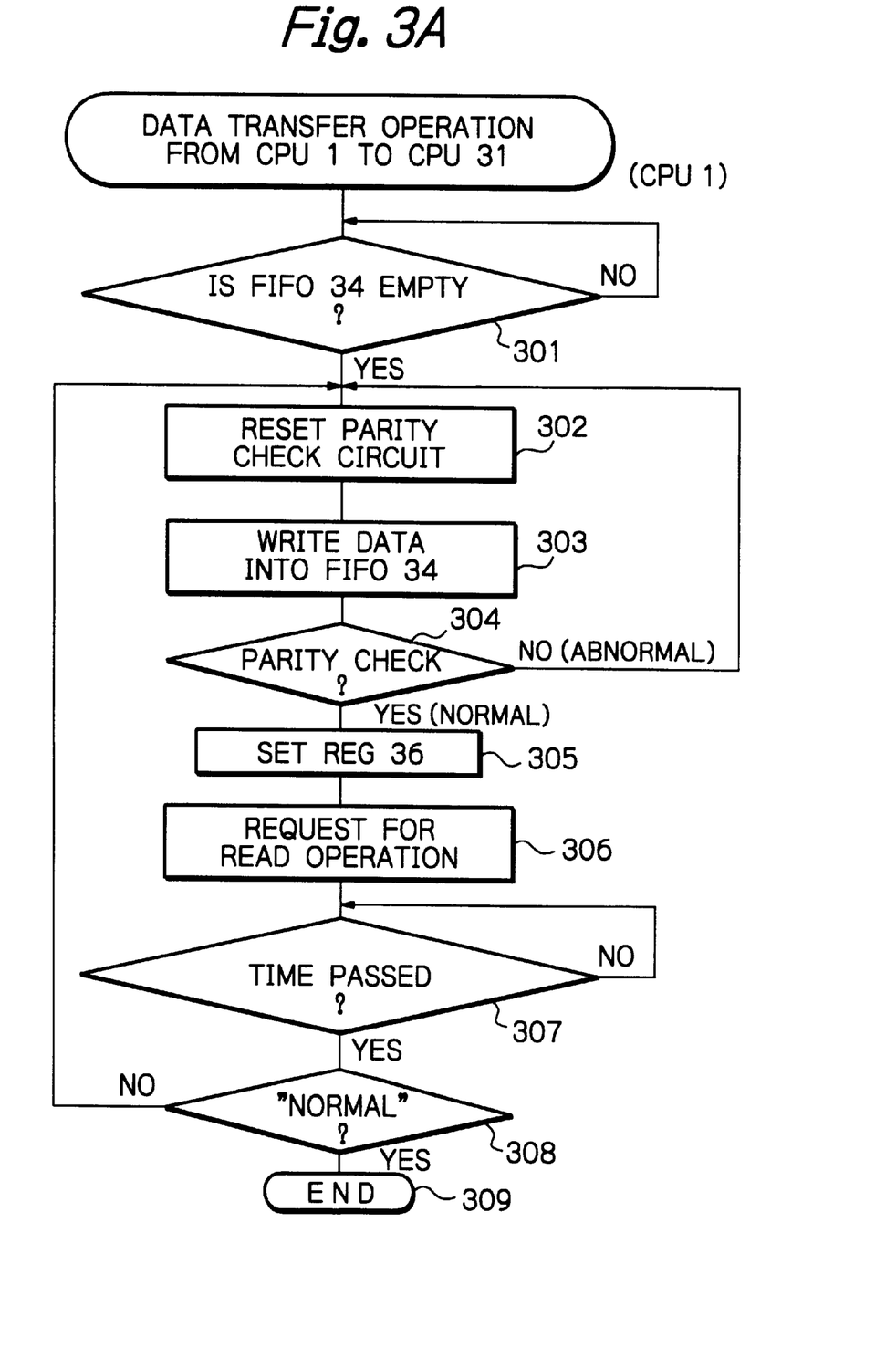
FIGS. 3A, 3B, 4A, 4B, 5A and 5B are flowcharts showing the operation of the system of FIG. 2.
Figure 3B:
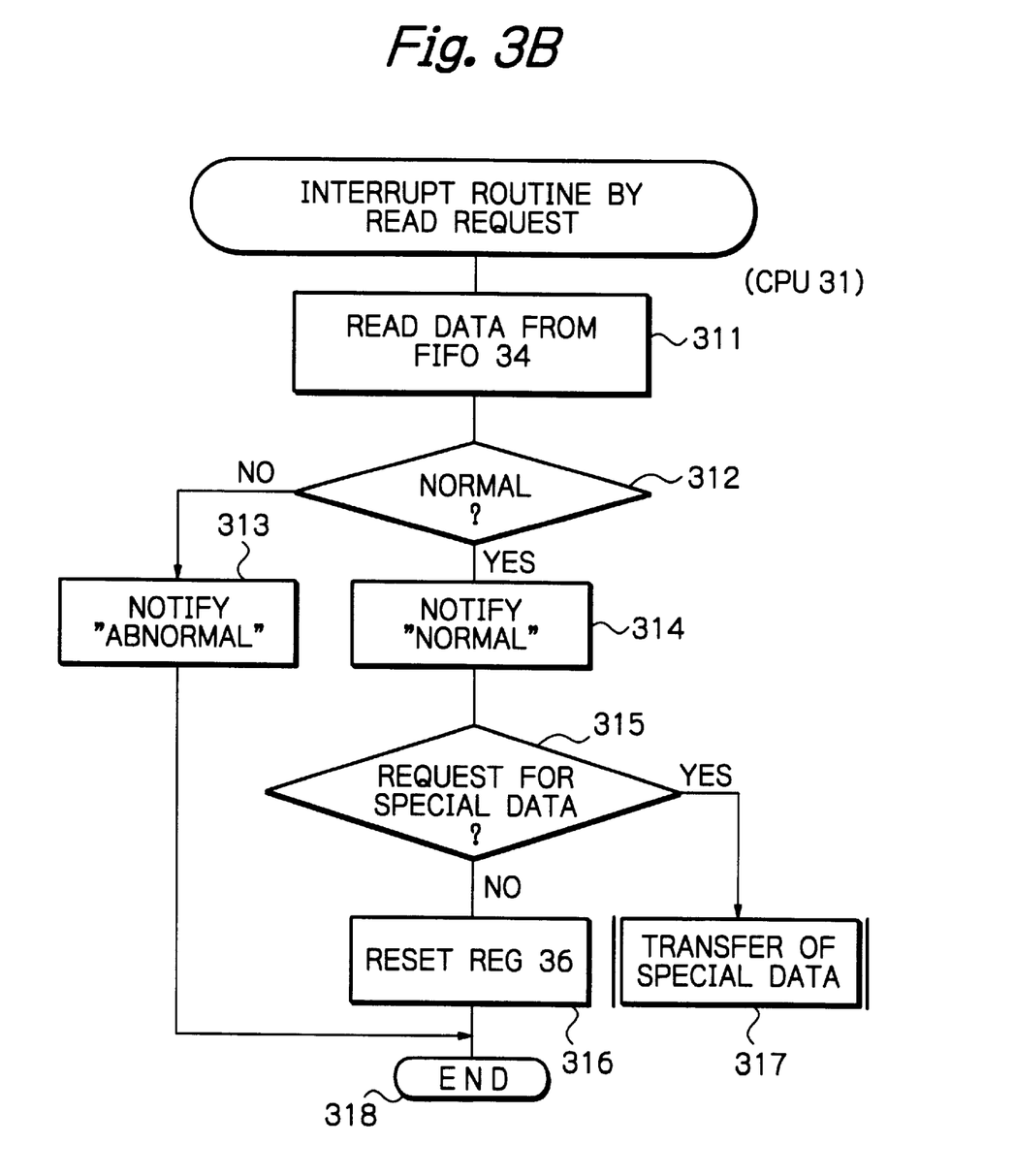

The data transfer operation from the CPU 1 to the CPU 31 is explained next with reference to FIGS. 3A and 3B. Note that the flowchart of FIG. 3A is carried out by the CPU 1, and the flowchart of FIG. 3B is carried out by the CPU 31. Here, assume that the selector 34$a$ and the output circuits 34$b$ and 34$c$ are initially in the first state, i.e., the selector 34$a$ selects the data bus DB2, the output circuit 34$b$ is in a through state, and the output circuit 34$c$ is in a high impedance state.

First, at step 301, the CPU 1 determines whether or not the FIFO 34 is available, i.e., the FIFO 34 is empty by checking the value of the register 36. Only if the FIFO 34 is empty, i e. the value of the register 36 is "0" does the control proceed to step 302.

At step 302, the CPU 1 resets the parity check circuit 40.

Next, at step 303, the CPU 1 writes data into the FIFO 34.

Next, at step 304, it is determined whether the data written into the FIFO 34 is normal or abnormal by means of the parity check circuit 40. If the written data is determined to be abnormal, the operation at steps 302 and 303 is repeated. If the written data is normal, the control proceeds to step 305.

At step 305, the CPU 1 sets the register 36, so that the value of the register 36 becomes "1".

At step 306, the CPU 1 operates the request circuit 38-1 to request the CPU 31 to read the data from the FIFO 34.

Note that the operation at steps 302 through 306 is repeated by steps 307 and 308 until the CPU 31 determines that the read data from the FIFO 34 is normal. Also, a time at step 307 corresponds to a read time period of the FIFO 34 by the CPU 31. This will be explained later.

Then, the flowchart of FIG. 3A is completed by step 309.

When the request circuit 38-1 generates an interrupt signal for requesting a read operation, the CPU 31 carries out an interrupt routine of FIG. 3B, which will be explained below.

First, at step 311, the CPU 31 reads the data from the FIFO 34.

Next, at step 312, it is determined whether the read data is normal or abnormal by means of a parity check circuit (not shown) connected to the data bus DB3. As a result, if the read data is abnormal, the control proceeds to step 313 which notifies the notification circuit 39-1 that the read data is abnormal, and then the control proceeds to step 318. On the other hand, if the read data is normal, the control proceeds to step 314 which notifies the notification circuit 39-1 that the read data is normal, and then the control proceeds to step 315.

Note that, as explained above, the CPU 1 recognizes the state of the notification circuit 39-1 by step 308 of FIG. 3A. If the read data is abnormal, the write operation of data is again carried out (see steps 302 through 306 of FIG. 3A).

At step 315, it is determined whether or not the read data includes a request for transmission of special data. If the read data does not include such a request for transmission, the control proceeds to step 316 which resets the register 36, so that the value of the register 36 becomes "1", thus completing the flowchart of FIG. 3B by step 314.

On the other hand, if the read data includes the above-mentioned request for transmission, the control proceeds from step 315 to step 317 which carries out a transmitting operation of special data. This will be explained later in detail.

Figure 4A:
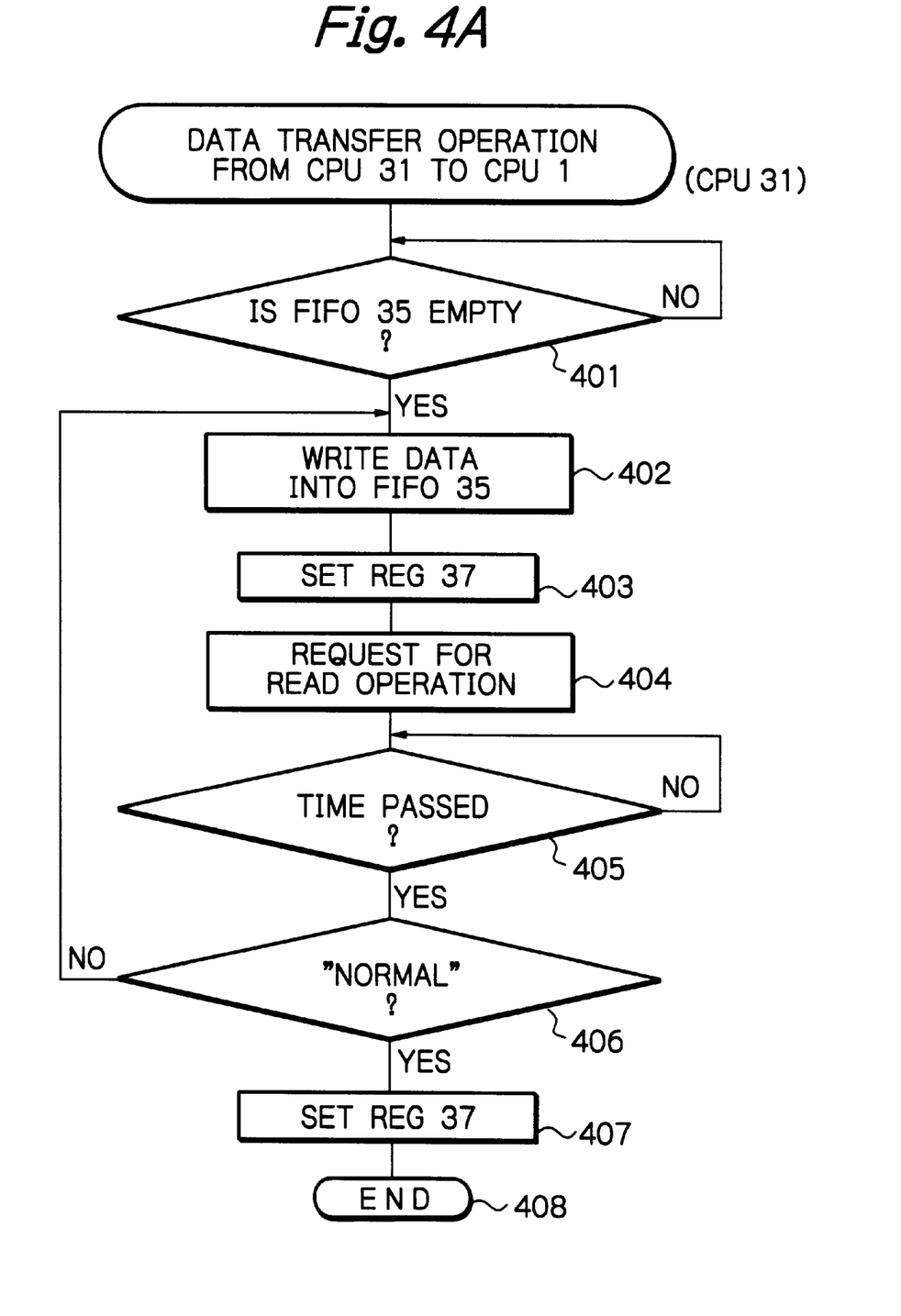
Figure 4B:
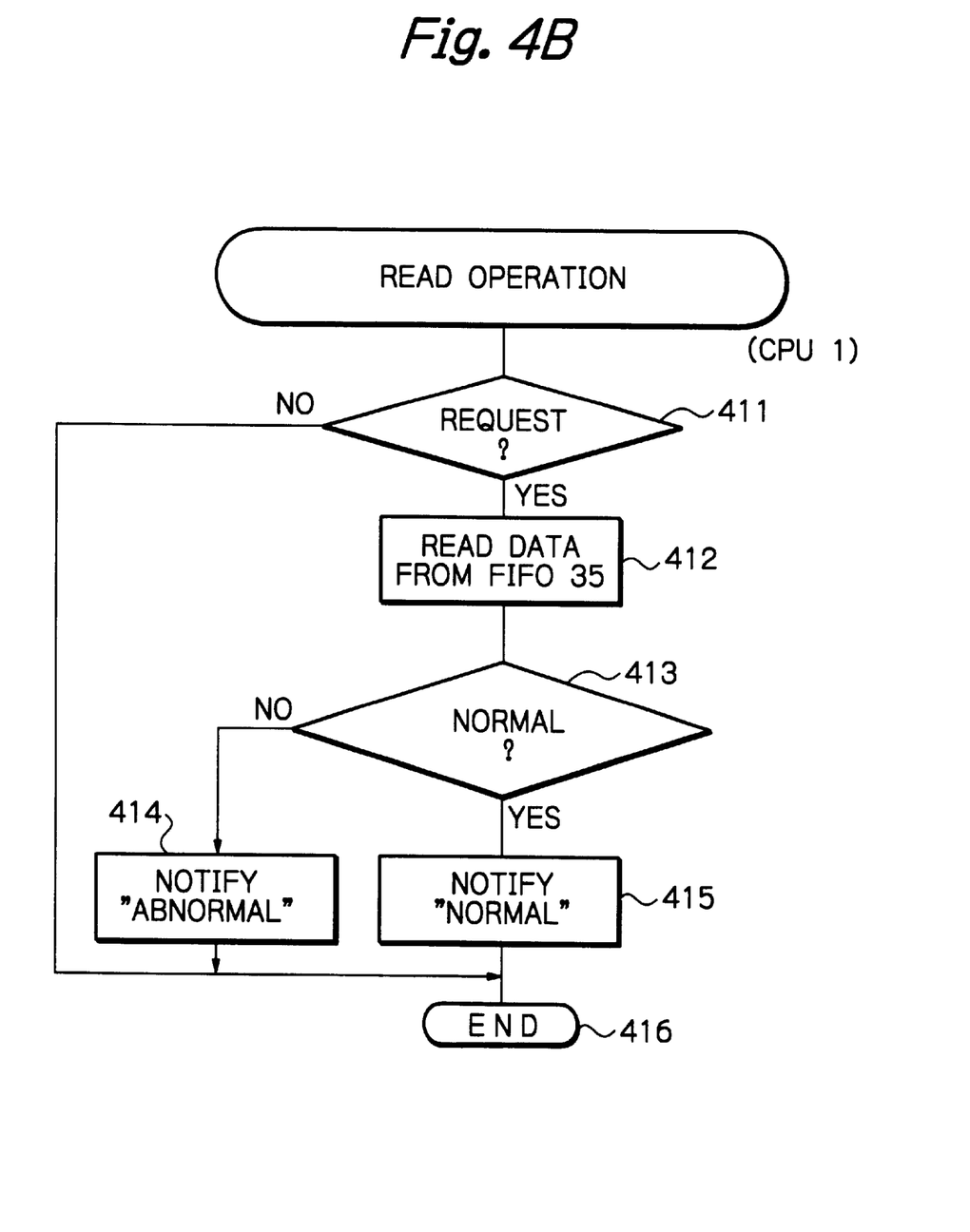

The data transfer operation from the CPU 31 to the CPU 1 is explained next with reference to FIGS. 4A and 4B. Note that the flowchart of FIG. 4A is carried out by the CPU 31, and the flowchart of FIG. 4B is carried out by the CPU 1. Here, also assume that the selector 34a and the output circuits 34b and 34c are initially in the first state, i.e., the selector 34a selects the data bus DB2, the output circuit 34b is in a through state, and the output circuit 34c is in a high impedance state.

First, at step 401, the CPU 31 determines whether or not the FIFO 35 is available, i.e., the FIFO 35 is empty by checking the value of the register 37. Only if the FIFO 35 is empty, i.e., the value of the register 37 is "0" does the control proceed to step 402.

Next, at step 402, the CPU 31 writes data into the FIFO 35.

At step 403, the CPU 31 sets the register 37, so that the value of the register 37 becomes "1".

At step 404, the CPU 31 operates the request circuit 38-2 to request the CPU 1 to read the data from the FIFO 35.

Note that the operation at steps 402 through 404 is repeated by steps 405 and 406 until the CPU 1 determines that the read data from the FIFO 35 is normal. Also, a time at step 405 corresponds to a read time period of the FIFO 35 by the CPU 1. This will be explanined later.

Then, if the data read by the CPU 1 is normal, the control preceeds to step 407 which resets the register 37, thus completing the flowchart of FIG. 4A by step 408.

In FIG. 4B, at step 411, it is determined whether or not a read request of the request circuit 38-2 has been recognized by the CPU 1. Only, if such a read request has been recognized by the CPU 1, does the control proceed to step 412. Otherwise, the control proceeds directly to step 416.

Next, at step 412, the CPU 1 reads the data from the FIFO 35.

Next, at step 413, it is determined whether the read data is normal or abnormal by means of a parity check circuit (not shown) connected to the data bus DB1. As a result, if the read data is abnormal, the control proceeds to step 414 which notifies the notification circuit 39-2 that the read data is abnormal. On the other hand, if the read data is normal, the control proceeds to step 315 which notifies the notification circuit 39-2 that the read data is normal.

Then, the flowchart of FIG. 4B is completed by step 416.

Note that, as explained above, the CPU 31 recognizes the state of the notification circuit 39-2 by step 406 of FIG. 4A. If the read data is abnormal, the write operation of data is again carried out (see steps 402 through 404 of FIG. 4A).

Figure 5A:
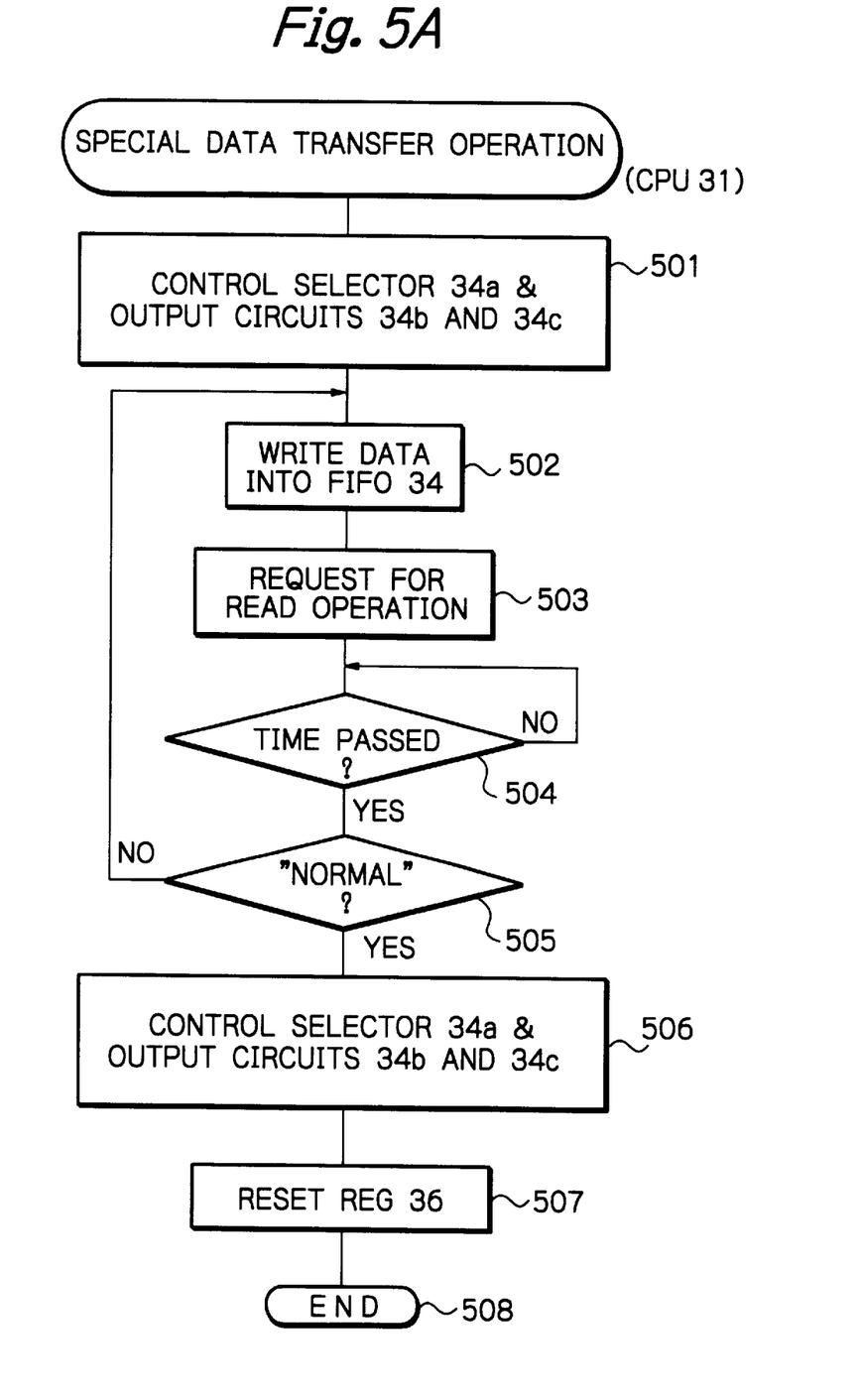
Figure 5B:
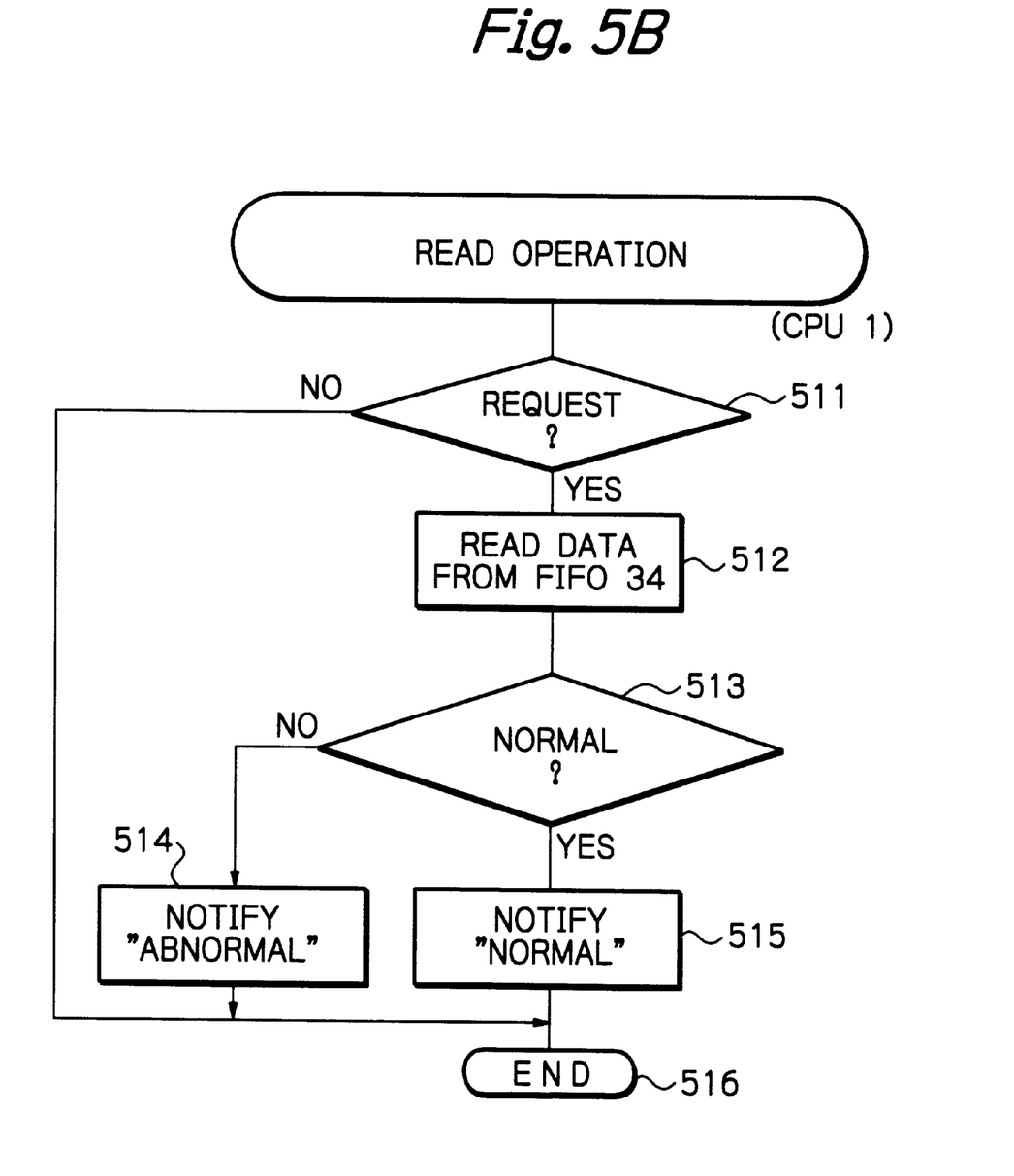

The special data transfer operation at step 317 of FIG. 3B from the CPU 31 to the CPU 11 is explained next with reference to FIGS. 5A and 5B. Note that the flowchart of FIG. 5A is carried out by the CPU 31, and the flowchart of FIG. 5B is carried out by the CPU 1.

In a case where the CPU 1 requests the CPU 31 to transmit specific data by means of the FIFO 34, if the CPU 31 is writing different data in the FIFO 35, the CPU 1 will have to receive a data different from the data it requested which will produce discrepancy in the operation of the system. To avoid such a discrepancy, the CPU 31 analyzes the data it received by way of the FIFO 34 and, if it finds out that it is requested to send specific data, it switches the direction of the input and the output of the FIFO 34 and then writes the requested specific data before it requests the CPU 1 to read the FIFO 34.

First, at step 501, the CPU 31 controls the selector 34a and the output circuits 34b and 34c to be in the second state. That is, the selector 34a selects the data bus DB3, the output circuit 34b is in a high impedance state, and the output circuit 34c is in a through state.

Next, at step 502, the CPU 31 writes requested special data into the FIFO 34.

At step 503, the CPU 31 operates the request circuit 38-3 to request the CPU 1 to read the data from the FIFO 34.

Note that the operation at steps 502 and 503 is repeated by steps 504 and 505 until the CPU 1 determines that the data read from the FIFO 34 is normal. Also, a time at step 504 corresponds to a read time period of the FIFO 34 by the CPU 1. This will be explanined later.

Next, if the data read by the CPU 1 is normal, the control preceeds to step 506 which controls the selector 34a and the output circuits 34b and 34c, so that they become in the first state.

Then, the control preceeds to step 507 which resets the register 36, thus completing the flowchart of FIGS. 5A by step 508.

In FIG. 5B, at step 411, it is determined whether or not a read request of the request circuit 38-3 has been recognized by the CPU 1. Only if such a read request has been recognized by the CPU 1, does the control proceed to step 512. Otherwise, the control proceeds directly to step 516.

Next, at step 512, the CPU 1 reads the data from the FIFO 34.

Next, at step 513, it is determined whether the read data is normal or abnormal by means of a parity check circuit (not shown) connected to the data bus DB1. As a result, if the read data is abnormal, the control proceeds to step 514 which notifies the notification circuit 39-3 that the read data is abnormal. On the other hand, if the read data is normal, the control proceeds to step 415 which notifies the notification circuit 39-3 that the read data is normal.

Then, the flowchart of FIG. 5B is completed by step 516.

Note that, as explained above, the CPU 31 recognizes the state of the notification circuit 39-3 by step 505 of FIG. 5A. If the read date is abnormal, the write operation of data is again carried out (see steps 502 and 503 of FIG. 5A).

In the above-described first embodiment, only the line/trunk circuits 3-1, 3-2, . . . have the FIFOs 34 and 35 so that data transfer is realized by means of the registers 36 and 37 for respectively showing if the FIFOs 34 and 35 are empty or contain data, the request circuit 38-1, 38-2 and 38-3 for respectively requesting the FIFOs 14 and 15 to be read, and the notification circuits 39-1, 39-2 and 39-3. Thus, the overall circuit configuration can be significantly simplified.

Additionally, in the first embodiment, the check circuit 40 is provided in the line/trunk circuits 3-1, 3-2, . . . to check if the CPU 1 succeeded to normally transmit data, so that the CPU 1 can proceed to the next processing operation without waiting from the response of the line/trunk circuits 3-1, 3-2, . . . if the result of the check shows a normal transmission of data to consequently improve the processing efficiency of the automatic switching system.

Still additionally, in the first embodiment, the line/trunk circuits 3-1, 3-2, . . . , the selector 34a and the output circuits 34b and 34c as means for switching the input and the output of the FIFO 34 for transmitting data to the line/trunk circuits 3-1, 3-2, . . . are provided, so that the data of the line/trunk circuits 3-1, 3-2, . . . can be transmitted immediately to the CPU 1 by means of the FIFO 14 if the CPU 1 requests the lin/trunk circuits 3-1, 3-2, . . . to transfer specific data.

Figure 6:
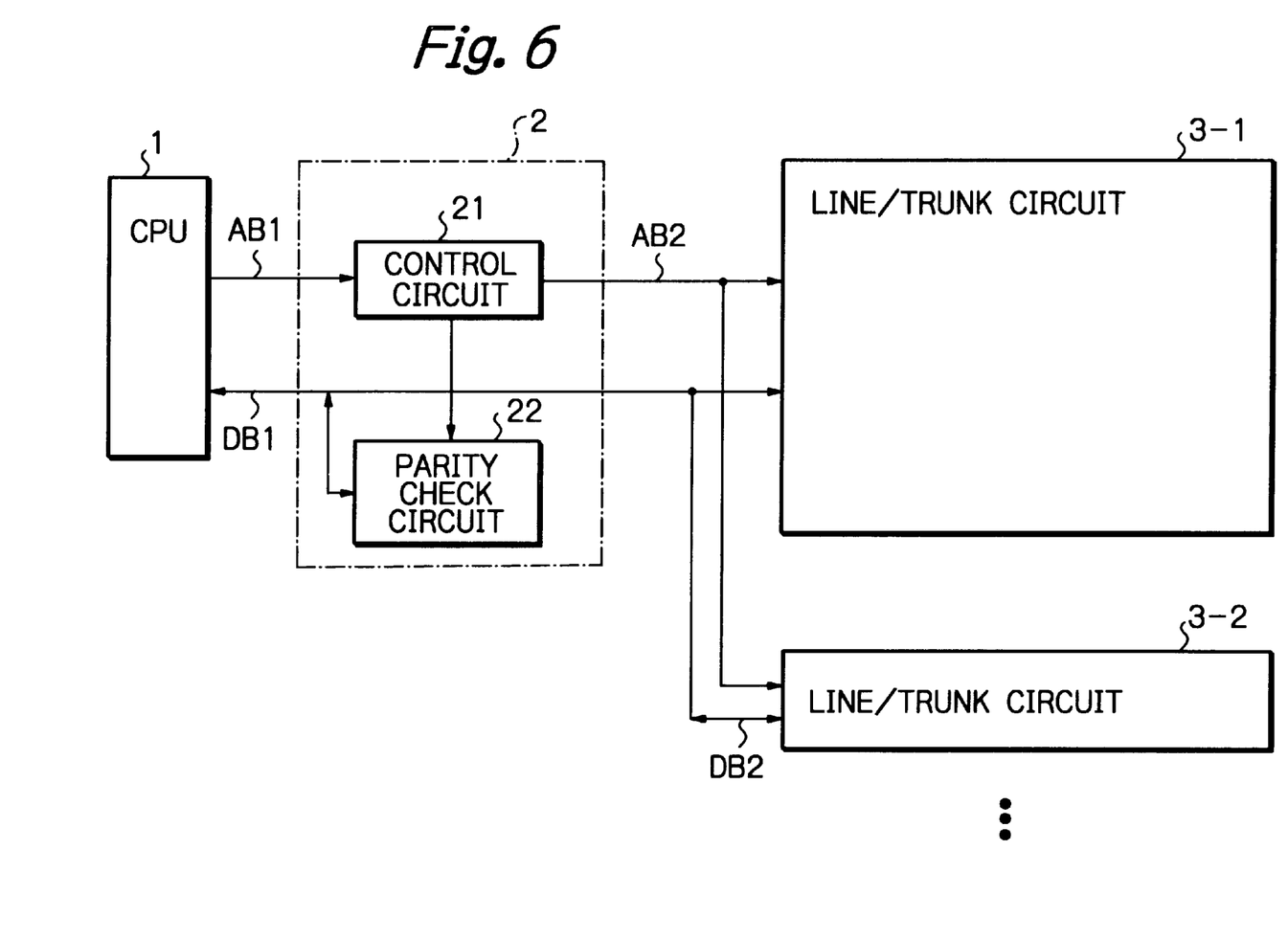
FIG. 6 is a block circuit diagram illustrating a second embodiment of the inter-processor data transfer system according to the present invention.

In FIG. 6, which illustrates a second embodiment of the inter-processor data transfer system according to the present invention, the interface circuit 2 includes a control circuit 21 and a parity check circuit 22. The parity check circuit 28 checks the data on the data buses DB1 and DB2.

The control circuit 21 is arranged between the address buses AB1 and AB2, and directs the parity check circuit 22 to output the outcome of its checking operation when the address specified by way of the address bus AB1 is the address of the parity check circuit 22.

For examples at step 304 of FIG. 3A, the parity check operation can be carried out at the parity check circuit 22 in FIG. 6. In this case, any data errors that occurred on the data bus DB1 can be discriminated from the data errors that occurred on the data bus DB2.

While the above-described embodiments are described in terms of a data transfer system between a CPU and a plurality of line/trunk circuits of an automatic switching system, the present invention is not limited thereto and can be applicable to any other systems.

As explained hereinabove, according to the present invention, the overall circuit of the system can be made very small.

Additionally, if the inter-processor data transfer system according to the present is applied to an automatic switching system constructed by a CPU and a plurality of line/trunk circuits, the processing ability of the automatic switching system can be improved. Further, the CPU of the automatic switching system can immediately transmit data to any of the line/trunk circuits.

We claim:

1. An inter-processor data transfer system between first and second processors, comprising.
    a first FIFO for data transmitted from said first processor to be written therein;
    a first register for indicating whether said first FIFO is write-enabled or write-disabled;
    a first request circuit for transmitting a write-request from said first processor to said second processor by way of said first FIFO;
    a first notification for notify said first processor of data received by said second processor by way of said first FIFO is normal or abnormal;
    a second FIFO for data transmitted from said second processor to be written therein;
    a second register for indicating whether said second FIFO is write-enabled or write-disabled;
    a second request circuit for transmitting a write-request from said second processor to said first processor by way of said second FIFO;
    a second notification for notify said second processor if data received by said first processor by way of said second FIFO is normal or abnormal.

2. The system as set forth in claim 1, further comprising:
    a switching means for switching said first FIFO to receive data transmitted from said second processor;
    a third request circuit for transmitting a write-request from said second processor to said first processor by way of said first FIFO; and
    a third notification circuit for notifying said second processor if data received by said first processor by said first FIFO is normal or abnormal.

3. The system as set forth in claim 2, wherein said first processor comprises:
    means for determining whether said first FIFO is write-enabled or write-disabled by searching said first register;
    means for writing first data into said first FIFO when said first FIFO is write-enabled;
    means for operating said first register to indicate that said first FIFO is write-disabled, after said first data is written into said first FIFO;
    means for operating said first request circuit after said first data is written into said first FIFO;
    means for determining whether or not said first data received by said second processor is normal or abnormal by searching said first notification circuit; and
    means for repetitively operating said first data writing means, said first register operating means and said first request circuit operating mean when said first data received by said second processor is abnormal,
    said second processor comprising:
    means for reading said first FIFO after receiving said write-request from said first request circuit;
    means for determining whether said first data read from said first FIFO is normal or abnormal;
    means for operating said first notification circuit to notify said first processor if said first data read from said first FIFO is normal or abnormal;
    means for determining whether or not said first data includes a request for transmission of special data when said first data read from said first FIFO is normal; and
    means for operating said first register to indicate that said first FIFO is write-enabled, when said first data read from said first FIFO does not include said request for transmission of special data, means for operating said switching means when said first data read from said first FIFO includes said request for transmission of special data;

means for writing said special data into said first FIFO when said first FIFO is write-enabled by said switching means;

means for operating said, third request circuit after said special data is written into said first FIFO;

means for determining whether or not said special data received by said first processor is normal or abnormal by searching said third notification circuit;

means for repetitively operating said special data writing means and said third request circuit operating mean when said special data received by said first processor is abnormal;

means for stopping the operation of said switching means when said special data received by said first processor is normal;

means for operating said first register to indicate that said first FIFO is write-enabled, when said special data read from said first FIFO is normal, said first processor further comprising:

means for reading said first FIFO after receiving said write-request from said third request circuit;

means for determining whether said special data read from said first FIFO is normal or abnormal; and means for operating said third notification circuit to notify said second processor if said special data read from said first FIFO is normal or abnormal.

4. The system as set forth in claim 1, further comprising an interface circuit connected between said first and second processors, said interface circuit having a check circuit.

5. The system as set forth in claim 1, wherein said first processor comprises:

means for determining whether said first FIFO is write-enabled or write-disabled by searching said first register;

means for writing first data into said first FIFO when said first FIFO is write-enabled;

means for operating said first register to indicate that said first FIFO is write-disabled, after said first data is written into said first FIFO;

means for operating said first request circuit after said first data is written into said first FIFO;

means for determining whether or not said first data received by said second processor is normal or abnormal by searching said first notification circuit; and means for repetitively operating said first data writing means, said first register operating means and said first request circuit operating mean when said first data received by said second processor is abnormal, said second processor comprising:

means for reading said first FIFO after receiving said write-request from said first request circuit;

means for determining whether said first data read from said first FIFO is normal or abnormal;

means for operating said first notification circuit to notify said first processor if said first data read from said first FIFO is normal or abnormal; and means for operating said first register to indicate that said first FIFO is write-enabled, when said first-data read from said first FIFO is normal.

6. The system as set forth in claim 1, wherein said second processor comprises:

means for determining whether said second FIFO is write-enabled or write-disabled by searching said second register;

means for writing second data into said second FIFO when said second FIFO is write-enabled;

means for operating said second register to indicate that said second FIFO is write-disabled, after said second data is written into said second FIFO;

means for operating said second request circuit after said second data is written into said second FIFO;

means for determining whether or not said second data received by said first processor is normal or abnormal by searching said second notification circuit;

means for repetitively operating said second data writing means, said second register operating means and said second request circuit operating mean when said second data received by said first processor is abnormal; and means for operating said second register to indicate that said second FIFO is write-enabled, when said second data read from said second FIFO is normal, said first processor comprising:

means for reading said second FIFO after receiving said write-request from said second request circuit;

means for determining whether said second data read from said second FIFO is normal or abnormal; and mean for operating said second notification circuit to notify said second processor if said second data read from said second FIFO is normal or abnormal.

7. The system as set forth in claim 1, being an automatic switching system, said second processor being provided in a line/trunk circuit of said automatic switching system.

* * * * *